US012484639B2

(12) United States Patent
Kim et al.

(10) Patent No.: US 12,484,639 B2
(45) Date of Patent: Dec. 2, 2025

(54) HEATER MODULE, METHOD OF MANUFACTURING THE HEATER MODULE, AND AEROSOL-GENERATING DEVICE WITH THE HEATER MODULE

(71) Applicant: KT&G CORPORATION, Daejeon (KR)

(72) Inventors: Dong Sung Kim, Seoul (KR); Won Kyeong Lee, Gyeonggi-do (KR); Heon Jun Jeong, Seoul (KR); Jae Sung Choi, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 654 days.

(21) Appl. No.: 17/434,170

(22) PCT Filed: Mar. 10, 2021

(86) PCT No.: PCT/KR2021/002985
§ 371 (c)(1),
(2) Date: Aug. 26, 2021

(87) PCT Pub. No.: WO2021/246621
PCT Pub. Date: Dec. 9, 2021

(65) Prior Publication Data

US 2022/0354184 A1 Nov. 10, 2022

(30) Foreign Application Priority Data

Jun. 3, 2020 (KR) ........................ 10-2020-0067175

(51) Int. Cl.
*A24F 40/70* (2020.01)
*A24F 40/40* (2020.01)
(Continued)

(52) U.S. Cl.
CPC .............. *A24F 40/70* (2020.01); *A24F 40/40* (2020.01); *A24F 40/46* (2020.01); *A24F 40/465* (2020.01);
(Continued)

(58) Field of Classification Search
CPC .......... A24F 40/70; A24F 40/40; A24F 40/46; A24F 40/465; H05B 6/10; H05B 6/105
See application file for complete search history.

(56) References Cited

U.S. PATENT DOCUMENTS 4,771,795 A 9/1988 White et al.
5,878,752 A * 3/1999 Adams .................. A24F 40/465 131/194

(Continued)

FOREIGN PATENT DOCUMENTS

CN 108523272 A 9/2018
EP 3 598 905 A1 1/2020

(Continued)

OTHER PUBLICATIONS

Translation of KR 10-2018-0070517 (Year: 2018).*

(Continued)

*Primary Examiner* — Michael H. Wilson
*Assistant Examiner* — Michael Patrick Mullen
(74) *Attorney, Agent, or Firm* — Sughrue Mion, PLLC

(57) ABSTRACT

A method of manufacturing a heater module for an aerosol-generating device includes: preparing a heat transfer pipe having a hollow shape and including a thermal conductive material; forming an assembly of the heat transfer pipe and a cover by insert molding in which heat transfer pipe is placed in a mold and resin is injected into the mold, such that one end of the cover is integrally coupled to an end of the heat transfer pipe while a side wall of the cover is spaced apart from the heat transfer pipe and surrounds the heat
(Continued)

transfer pipe; arranging a heater on an outer surface of the heat transfer pipe; and sealing, with a sealing stopper, a space between the heat transfer pipe and the cover such that internal pressure of the space is lower than atmospheric pressure.

17 Claims, 20 Drawing Sheets

(51) Int. Cl.

| | |
|---|---|
| ***A24F 40/46*** | (2020.01) |
| ***A24F 40/465*** | (2020.01) |
| ***H05B 6/10*** | (2006.01) |
| *A24F 40/20* | (2020.01) |
| *A24F 40/30* | (2020.01) |
| *A24F 40/50* | (2020.01) |

(52) U.S. Cl.

CPC ................ *H05B 6/10* (2013.01); *A24F 40/20* (2020.01); *A24F 40/30* (2020.01); *A24F 40/50* (2020.01); *H05B 6/105* (2013.01)

(56) References Cited

U.S. PATENT DOCUMENTS

| | | | | |
|---|---|---|---|---|
| 7,565,744 | B2 * | 7/2009 | Matsui | F04B 43/043 137/859 |
| 11,051,551 | B2 | 7/2021 | Abramov et al. | |
| 11,298,768 | B2 * | 4/2022 | Fuesting | B23K 20/24 |
| 2014/0332020 | A1 * | 11/2014 | Li | A61M 15/06 392/390 |
| 2015/0027471 | A1 * | 1/2015 | Feldman | H05B 3/06 392/395 |
| 2018/0085551 | A1 | 3/2018 | Krietzman | |
| 2019/0200678 | A1 | 7/2019 | Thorson et al. | |
| 2020/0086068 | A1 | 3/2020 | Lee et al. | |
| 2020/0093177 | A1 | 3/2020 | Han et al. | |
| 2020/0281273 | A1 | 9/2020 | Kim et al. | |
| 2022/0042641 | A1 * | 2/2022 | Radhakrishnan | F17C 3/08 |

FOREIGN PATENT DOCUMENTS

| | | | | |
|---|---|---|---|---|
| FR | 1375670 | A | 10/1964 | |
| KR | 101647276 | B1 | 8/2016 | |
| KR | 1020180070517 | A * | 6/2018 | A24B 15/167 |
| KR | 10-2018-0126603 | A | 11/2018 | |
| KR | 10-2019-0049390 | A | 5/2019 | |
| KR | 10-2057216 | B1 | 12/2019 | |
| KR | 10-2020-0011375 | A | 2/2020 | |
| KR | 10-2071076 | B1 | 3/2020 | |
| WO | 2007143993 | A2 | 12/2007 | |
| WO | 2019/030170 | A1 | 2/2019 | |
| WO | 2019/053268 | A1 | 3/2019 | |
| WO | 2019/110669 | A1 | 6/2019 | |
| WO | WO-2020074601 | A1 * | 4/2020 | A24F 40/20 |

OTHER PUBLICATIONS

Office Action issued Feb. 21, 2022 in Korean Application No. 10-2020-0067175.

Extended European Search Report dated May 11, 2022 from the European Patent Office in EP Application No. 21755887.3.

International Search Report dated Sep. 1, 2021, issued by the International Searching Authority in application No. PCT/KR2021/002985.

Communication dated Mar. 28, 2025 issued by the State Intellectual Property Office of the P.R. China in application No. 202180003345.0.

* cited by examiner

HEATER MODULE, METHOD OF MANUFACTURING THE HEATER MODULE, AND AEROSOL-GENERATING DEVICE WITH THE HEATER MODULE

CROSS REFERENCE TO RELATED APPLICATIONS

This application is a National Stage of International Application No. PCT/KR2021/002985 filed Mar. 10, 2021, claiming priority based on Korean Patent Application No. 10-2020-0067175 filed Jun. 3, 2020.

TECHNICAL FIELD

One or more embodiments relate to a heater module, a method of manufacturing the heater module, and an aerosol-generating device including the heater module, and more particularly, to a heater module with improved heating performance and safety, a method of manufacturing the heater module, and an aerosol-generating device including the heater module.

BACKGROUND ART

A heater module that heats an object to a desired temperature by generating heat through operation by electricity is used for various purposes such as home or industrial use. In order to quickly heat the object, the heater module generates high-temperature heat, in which case stability and energy efficiency may be reduced by heat that is discharged to the outside and lost.

DISCLOSURE

Technical Problem

One or more embodiments provide a heater module, which is capable of quickly and stably heating an object by blocking heat that is lost and has improved energy efficiency, a method of manufacturing the heater module, and an aerosol generating apparatus including the heater module.

Technical Solution

A method of manufacturing a heater module, according to an embodiment, includes: preparing a heat transfer pipe including a material for transferring heat and having a hollow shape; forming an assembly of the heat transfer pipe and a cover by molding the cover, the cover having one end integrally coupled to an end of the heat transfer pipe by an insert molding process, in which the heat transfer pipe is placed in a mold and resin is injected into the mold, and being spaced apart from an outer surface of the heat transfer pipe to surround the outer surface of the heat transfer pipe; arranging a heater on the outer surface of the heat transfer pipe; and sealing, with a sealing stopper, a space between the heat transfer pipe and the cover, such that the space between the heat transfer pipe and the cover is in a vacuum state in which an internal pressure of the space is lower than atmospheric pressure.

Advantageous Effects

According to the heater module, the method of manufacturing the heater module, and the aerosol-generating device including the heater module, according to the above-described embodiments, an object may be quickly and stably heated by blocking heat that is lost.

In addition, heat loss may be reduced by maintaining a portion of the inside of the heater module in a vacuum state, which has a pressure lower than atmospheric pressure, thereby improving heating performance and stability.

BEST MODE

Figure 1:
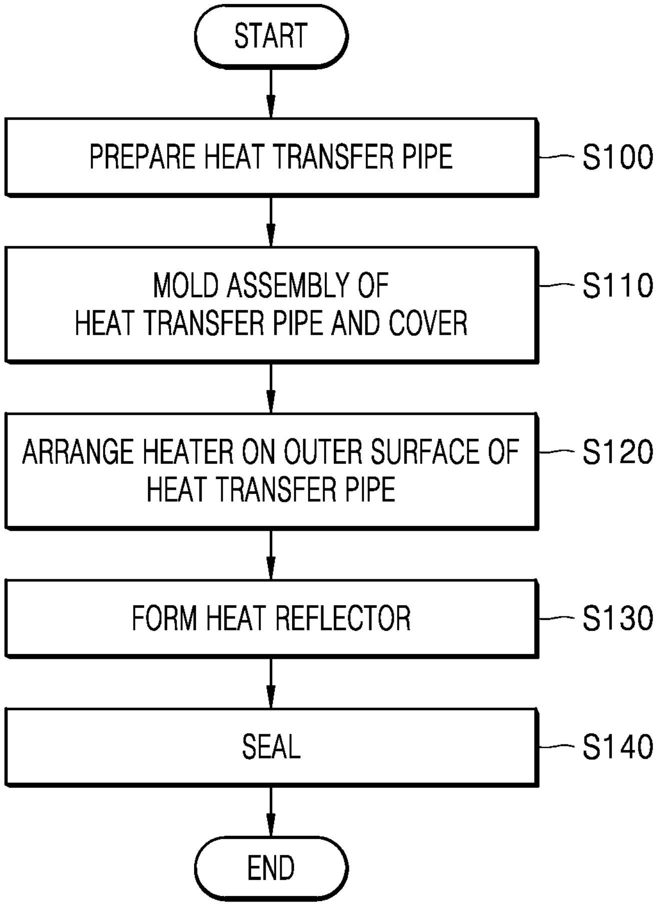
FIG. 1 is a flowchart illustrating operations of a method of manufacturing a heater module, according to an embodiment.

A method of manufacturing a heater module, according to an embodiment, includes: preparing a heat transfer pipe having a hollow shape and including a thermal conductive material; forming an assembly of the heat transfer pipe and a cover by insert molding in which heat transfer pipe is placed in a mold and resin is injected into the mold, such that one end of the cover is integrally coupled to an end of the heat transfer pipe while a side wall of the cover is spaced apart from the heat transfer pipe and surrounds the heat transfer pipe; arranging a heater on an outer surface of the heat transfer pipe; and sealing, with a sealing stopper, a space between the heat transfer pipe and the cover such that internal pressure of the space is lower than atmospheric pressure.

A heater module according to an embodiment includes: a heat transfer pipe having a hollow shape and including a thermal conductive material; a cover having one end integrally coupled to an end of the heat transfer pipe, and a side wall spaced apart from the heat transfer pipe and surrounding the heat transfer pipe; a heater arranged on an outer surface of the heat transfer pipe and configured to generate heat; and a sealing stopper that seals a space between the heat transfer pipe and the cover such that internal pressure of the space is lower than atmospheric pressure.

An aerosol-generating device according to an embodiment includes: heater module including a heat transfer pipe having a hollow shape and including a thermal conductive material; a cover having one end integrally coupled to an end of the heat transfer pipe, and a side wall spaced apart from the heat transfer pipe and surrounding the heat transfer pipe; a heater arranged on an outer surface of the heat transfer pipe and configured to generate heat; and a sealing stopper that seals a space between the heat transfer pipe and the cover such that internal pressure of the space is lower than atmospheric pressure; and a controller electrically connected to the heater module and configured to control the operation of the heater module.

Mode for Invention

The disclosure will now be described more fully with reference to the accompanying drawings, in which embodiments of the disclosure are shown. The disclosure may, however, be embodied in many different forms and should not be construed as being limited to the embodiments set forth herein; rather, these embodiments are provided so that this disclosure will be thorough and complete and will fully convey the concept of the disclosure to one of ordinary skill in the art, and the disclosure will only be defined by the appended claims. The terms used herein are merely used to describe embodiments, and are not intended to limit the disclosure. The singular forms “a,” “an,” and “the” are intended to include the plural forms as well, unless the context clearly indicates otherwise. It will be further understood that the terms “includes”, “comprises”, “comprising”, and “including” used herein specify the presence of stated components, steps, operations, and/or elements, but do not preclude the presence or addition of one or more other components, steps, operations, and/or elements. While such terms as “first,” “second,” etc., may be used to describe various components, such components must not be limited to the above terms. The above terms are used only to distinguish one component from another.

FIG. 1 is a flowchart illustrating operations of a method of manufacturing a heater module, according to an embodiment.

The method of manufacturing the heater module, according to the embodiment shown in FIG. 1, includes operation S100 of preparing a heat transfer pipe and including a material for transferring heat, operation S110 of molding an assembly of the heat transfer pipe and a cover by integrally coupling the cover to the heat transfer pipe by an insert molding process, operation S120 of arranging a heater on the outer surface of the heat transfer pipe, operation S130 of forming a heat reflector, and operation S140 of sealing a space between the heat transfer pipe and the cover.

Although the method of manufacturing the heater module includes operation S130 of forming the heat reflector, embodiments are not limited thereto, and operation S130 of forming the heat reflector may be omitted. For example, if a cover is made of a material with excellent heat reflecting performance, or if a cover is made of plastic or metal and the inner side of the cover is pre-coated with a material with excellent heat reflecting performance, operation S130 of forming the heat reflector may be omitted after operation S110 of molding the assembly of the heat transfer pipe and the cover.

In operation S110, the assembly of the heat transfer pipe and the cover may be molded by an insert molding process in which the heat transfer pipe is placed in a mold and resin is injected into the mold. As a result, one end of the cover may be integrally coupled to the end of the heat transfer pipe, and a side wall of the cover may be spaced apart from the outer surface of the heat transfer pipe and surround the outer surface of the heat transfer pipe.

In operation S140, the space between the heat transfer pipe and the cover is sealed with a sealing stopper such that the space between the heat transfer pipe and the cover is in a vacuum state that is lower than atmospheric pressure.

Figure 2:
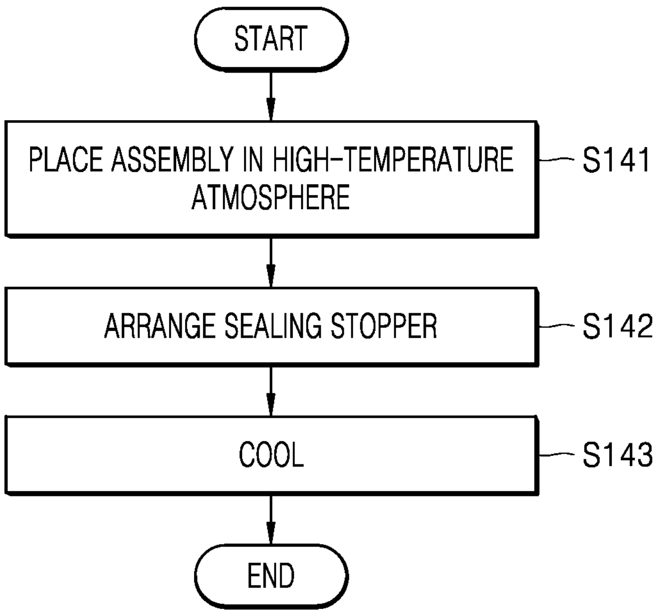
FIG. 2 is a flowchart illustrating an example of an operation of the method of manufacturing a heater module, according to the embodiment shown in FIG. 1.

FIG. 2 is a flowchart illustrating an example of an operation of the method of manufacturing the heater module, according to the embodiment shown in FIG. 1, and illustrates specific operations for executing operation S140 of sealing the space between the heat transfer pipe and the cover.

Referring to FIG. 2, operation S140 of sealing the space between the heat transfer pipe and the cover includes operation S141 of placing the assembly of the heat transfer pipe and the cover in a high-temperature atmosphere, operation S142 of arranging, in the assembly of the heat transfer pipe and the cover, a sealing stopper for sealing the space between the heat transfer pipe and the cover, and operation S143 of cooling an assembled heater module.

In the method of manufacturing the heater module, in order to maintain the space between the heat transfer pipe and the cover in a vacuum state during a process of manufacturing the heater module, a process of coupling the sealing stopper to the assembly of the heat transfer pipe and the cover may be performed under a high-temperature atmosphere, and by performing operation S143 of cooling the heater module, a vacuum state may be naturally formed inside the heater module. That is, because air inside the heater module expands under a high-temperature atmosphere and then the air is cooled and contracted again by operation S143 of cooling the heater module, a vacuum state is formed inside the heater module.

According to the above-described embodiment, it is not necessary to perform a separate process of extracting air from the heater module in order to implement a vacuum state of the inner side of the heater module after assembling the heater module, and thus a process of manufacturing the heater module may be streamlined.

In some existing methods of assembling the heater module, to avoid the complicated process of implementing a vacuum state, a vacuum pipe module is separately purchased and connected to the heater module. However, in such cases, the design and size of the heater module have to be determined depending on the design of the vacuum pipe module, and thus, it is difficult to freely design the heater module and manufacturing cost thereof may be increased.

According to the embodiments, because a vacuum state inside the heater module may be naturally formed during a process of manufacturing the heater module, manufacturing cost may be reduced and manufacturing processes may be simplified.

Herein, the term ‘vacuum state’ formed inside the heater module refers to a state in which the heater module has a low air pressure that may prevent the heat generated by a heater from being radiated to the outside of the heater module, and does not denote that a perfect vacuum state in which no air is present. Therefore, the vacuum state inside the heater module includes a state of pressure lower than the atmospheric pressure. For example, assuming that the atmospheric pressure is 1 atm (760 mmHg), the vacuum state inside the heater module may include a low pressure state of about 0.3 atm to about 0.8 atm.

FIGS. 3 to 12 are explanatory diagrams illustrating operations of the method of manufacturing the heater module, according to the embodiment shown in FIGS. 1 and 2.

Figure 3:
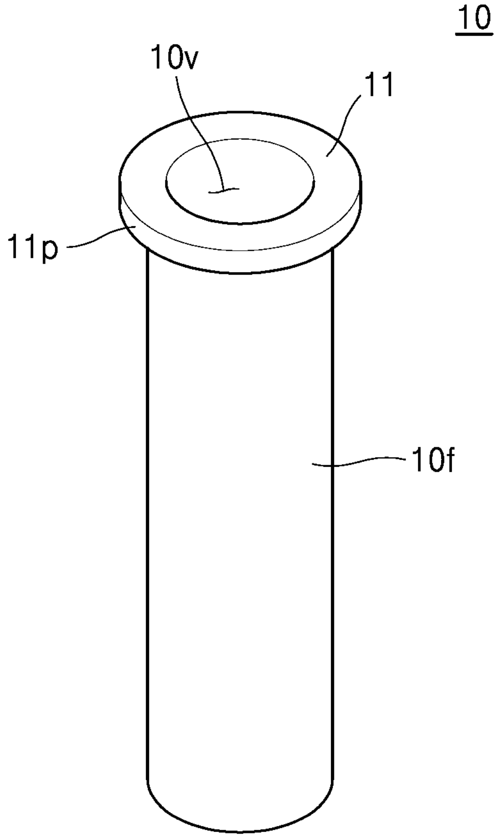
FIGS. 3 to 12 are explanatory diagrams illustrating operations of the method of manufacturing a heater module, according to the embodiment shown in FIGS. 1 and 2.

FIG. 3 illustrates an operation of preparing a heat transfer pipe 10 (see S100 in FIG. 1). The heat transfer pipe 10 may be made of a thermally conductive metal material including any one of stainless steel, aluminum, and copper, or a combination thereof. The heat transfer pipe 10 performs a function of transferring heat generated from a heater to an object to be heated.

The heat transfer pipe 10 may be prepared through, for example, a process of cutting and bending a metal pipe, or a forging process. Alternatively, the heat transfer pipe 10 may be prepared through a casting process using a mold prepared in advance.

The heat transfer pipe 10 is formed as a cylindrical tube including a receiving passage 10*v* capable of accommodating an object to be heated therein. The heat transfer pipe 10 includes a flange 11*p*, which protrudes radially from one end 11 of the heat transfer pipe 10, for coupling with a cover to be described below.

Because a heater is arranged outside of the heat transfer pipe 10, the heat transfer pipe 10 may mainly perform a function of transferring heat transferred through the outer surface 10*f* to the receiving passage 10*v*.

Embodiments are not limited by the structure of the heat transfer pipe 10 shown in the drawings, and the heat transfer pipe 10 may have, for example, a polygonal cylindrical shape having a polygonal cross-section.

Figure 4:
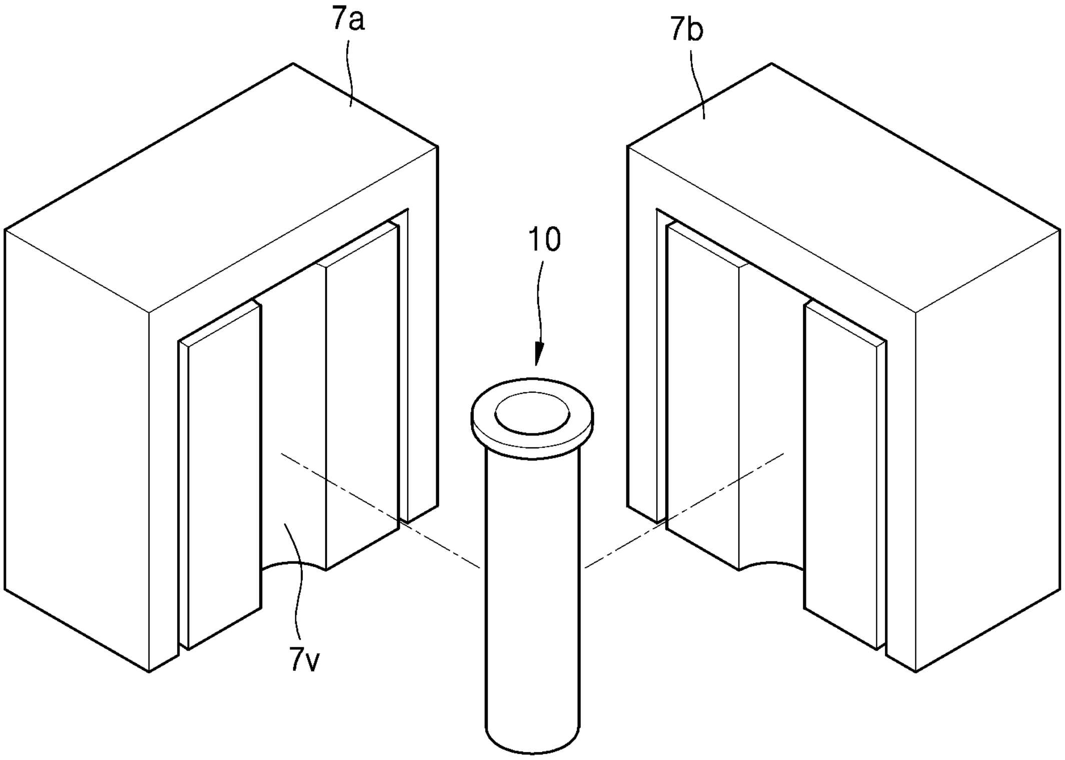

FIG. 4 illustrates an operation of molding an assembly of the heat transfer pipe 10 and the cover by an insert molding process (see S110 in FIG. 1). In the operation of molding the assembly of the heat transfer pipe and the cover, the heat transfer pipe 10 is arranged in a cavity 7*v* of a mold 7*a* and 7*b*, and the heat transfer pipe 10 and the cover is integrated by an insert molding process in which melted resin is injected into the mold 7*a* and 7*b*. As a result, the assembly of the heat transfer pipe and the cover is integrally molded.

Figure 5:
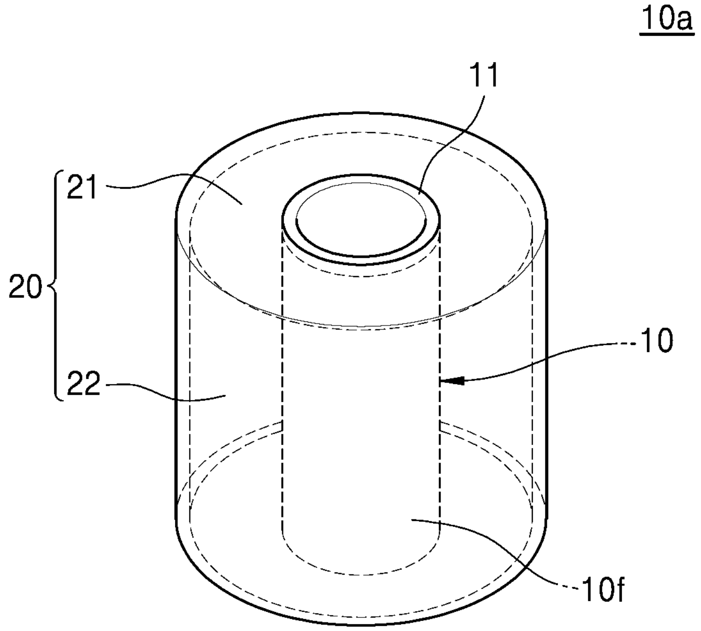

FIG. 5 illustrates an assembly 10*a* of a heat transfer pipe 10 and a cover 20 integrally formed by an insert molding process.

As the material of the cover 20, for example, one of polycarbonate (PC), polybutylenterephthalate (PBT), and polyetheretherketone (PEEK) or a mixture thereof may be used.

The cover 20 includes one end 21 integrally coupled to one end 11 of the heat transfer pipe 10, and a side wall 22 connected to the one end 21 and spaced apart from an outer surface 10*f* of the heat transfer pipe 10 to surround the outer surface 10*f* of the heat transfer pipe 10. In the assembly 10*a* of the heat transfer pipe 10 and the cover 20, the side wall 22 of the cover 20 is spaced apart from the outer surface 10*f* of the heat transfer pipe 10.

Figure 6:
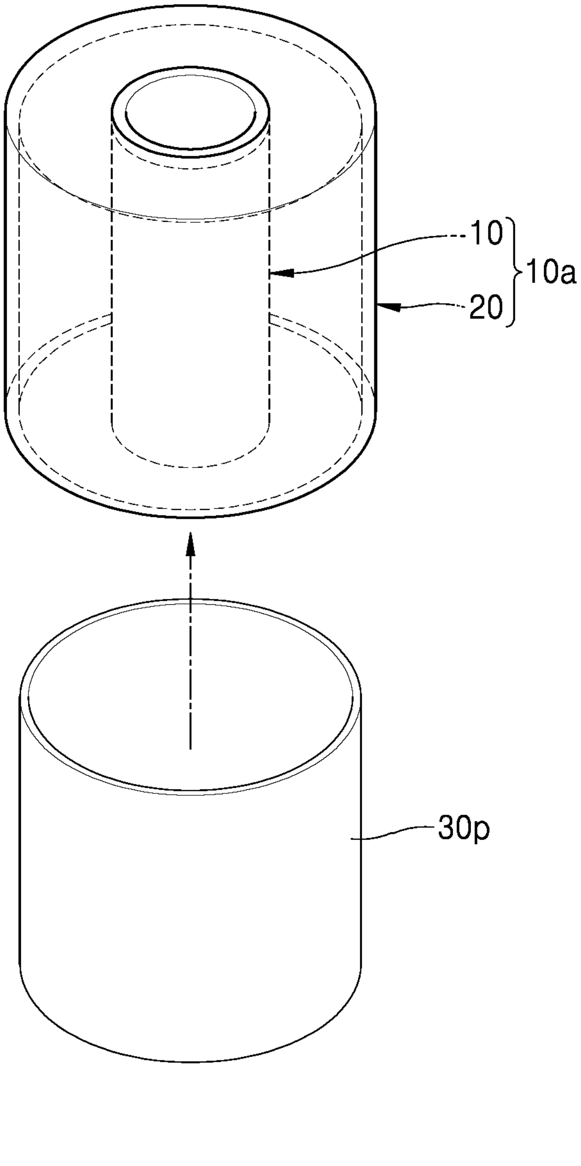

FIG. 6 illustrates an example of an operation of forming a heat reflector inside the cover 20 (see S130 in FIG. 1). The operation of forming the heat reflector inside the cover 20 includes an operation of preparing a heat reflecting pipe 30*p* including a material that reflects heat, and an operation of inserting the heat reflecting pipe 30*p* inside the cover 20.

A heat reflecting pipe 30*p* having an outer diameter corresponding to the inner diameter of the cover 20 may be prepared in advance. Therefore, when the heat reflecting pipe 30*p* is inserted inside the cover 20, the heat reflecting pipe 30*p* may be fixed to the inside of the cover 20. According to an embodiment, a thermally conductive adhesive layer may be arranged between the heat reflecting pipe 30*p* and the cover 20. That is, an adhesive layer having an adhesive property and good thermal conductivity is arranged on an outer surface of the heat reflecting pipe 30*p* and/or an inner surface of the cover 20, the heat reflecting pipe 30*p* and the cover 20 may be coupled to each other by inserting the heat reflecting pipe 30*b* inside the cover 20.

The heat reflecting pipe 30*p* may include at least one of a reinforced carbon material layer, an alumina reflective layer coating, and a white protective layer. The layers may be stacked inside of the heat reflecting pipe 30*p*.

Figure 7:
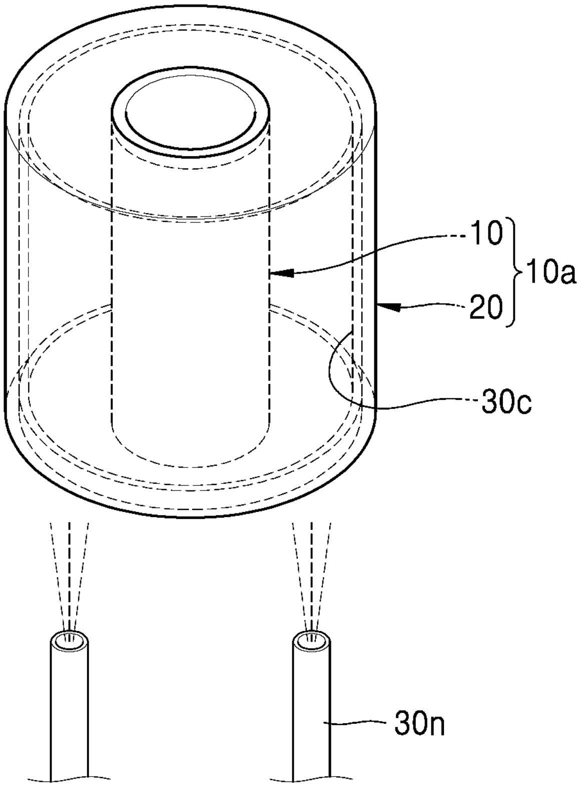

FIG. 7 illustrates another example of an operation of forming a heat reflector inside the cover 20 (see S130 in FIG. 1). The operation of forming the heat reflector on the inside of the cover 20 may include an operation of coating a heat reflective material on the inside of the cover 20. In the operation of coating the heat reflective material on the inside of the cover 20, a spray method by which the heat reflective material is sprayed toward the inside of the cover 20 by using a nozzle 30*n* may be used to form a coating layer 30*c*, as shown in FIG. 7.

When forming the coating layer 30*c*, the remaining area inside the assembly 10*a* of the heat transfer pipe 10 and the cover 20, that is, the outer surface of the heat transfer pipe 10, may be temporarily covered with a protective member to prevent the heat reflective material from being applied to the outer surface of the heat transfer pipe 10.

Embodiments are not limited to an example of using the spray method to coat a heat reflective material on the inside of the cover 20. For example, a heat reflective material may be coated on the inside of the cover 20 by using a method of immersing the assembly 10*a* of the heat transfer pipe 10 and the cover 20 in a storage tank in which the heat reflective material is accommodated, or by using various other deposition methods.

Figure 8:
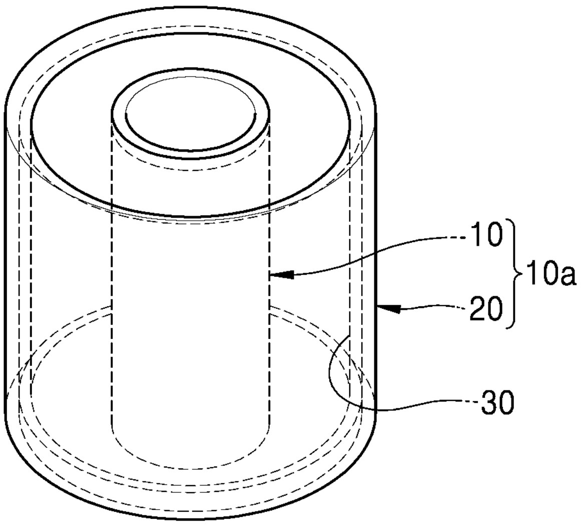

FIG. 8 illustrates a state in which the heat reflector 30 is formed inside the cover 20, after the operation shown in FIG. 6 or 7 is performed.

After a heat reflective material is coated on the inside of the cover 20, the heat reflective material coated on the inside of the cover 20 may be dried sufficiently by drying at room temperature or using hot air.

Figure 9:
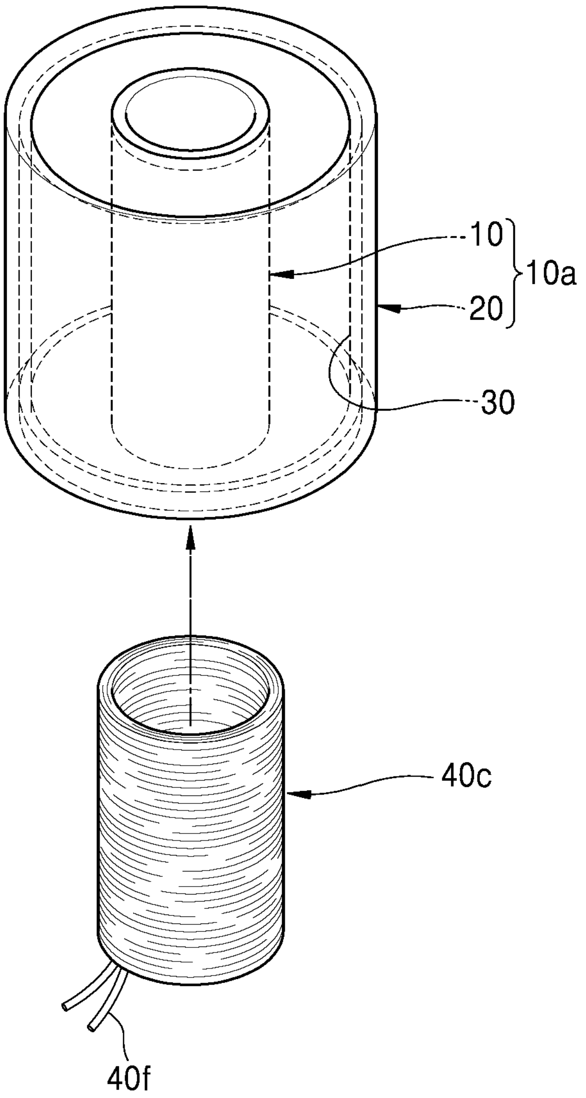
Figure 10:
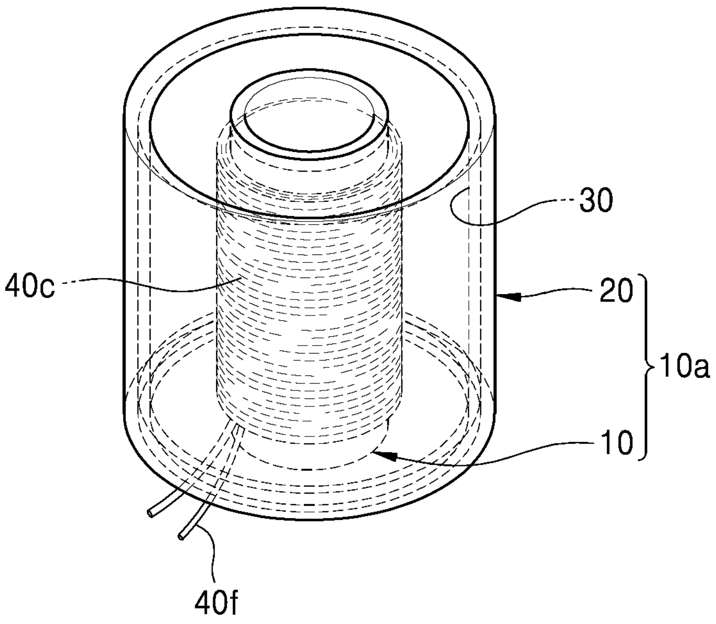

FIGS. 9 and 10 illustrate an operation of arranging a heater 40*c* outside of the heat transfer pipe 10. The operation of arranging the heater 40*c* includes an operation of preparing the heater 40*c* in which a heating wire is wound to form a cylindrical shape corresponding to the shape of the heat transfer pipe 10, and an operation of arranging the heater 40*c* to surround the outer surface of the heat transfer pipe 10.

The heater 40*c* formed by a coil includes a lead wire 40*f* for receiving electricity from the outside. A protective layer may be formed on one of the outer and inner sides of the heater 40*c* or both of the outer and inner sides of the heater 40*c*. The heater 40*c* may be an electric resistance heater capable of generating heat when electricity is applied from the outside to the lead wire 40*f*. For the heater 40*c*, a metal material having electric heating function, such as copper or stainless steel, may be used.

Embodiments are not limited by an operation of arranging the heater 40*c* on the outer surface of the heat transfer pipe 10, such as the operations shown in FIGS. 9 and 10. For example, the heater 40*c* may be arranged on the outer surface of the heat transfer pipe 10 by directly winding a heating wire on the outer surface of the heat transfer pipe 10.

In addition, the overall shape of the heater 40*c* is not necessarily limited to a cylindrical shape, and the heater 40*c* may be manufactured to have a hollow cylindrical shape having a polygonal cross-section corresponding to the shape of the heat transfer pipe 10.

Figure 11:
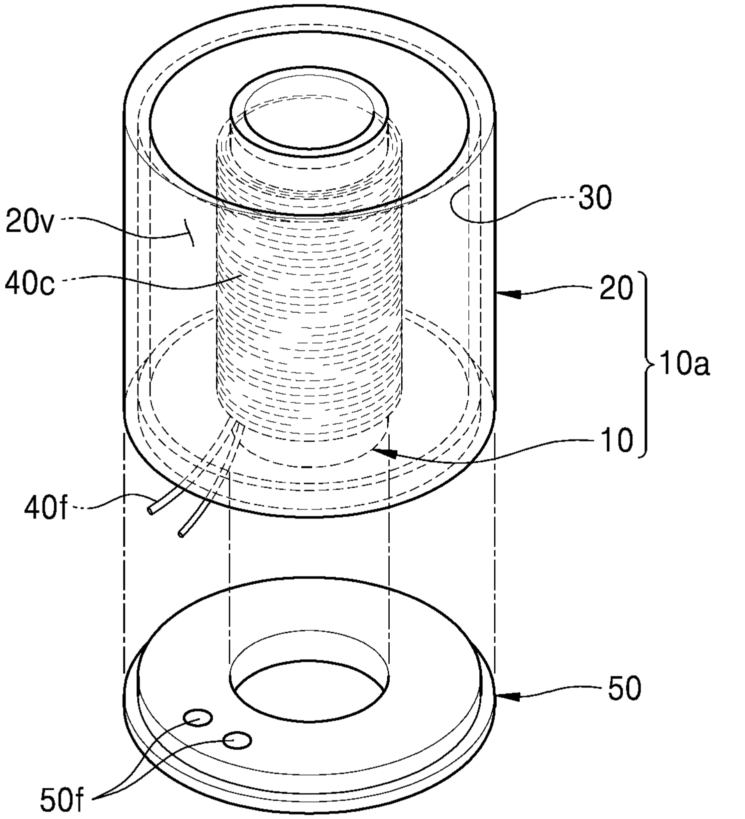
Figure 12:
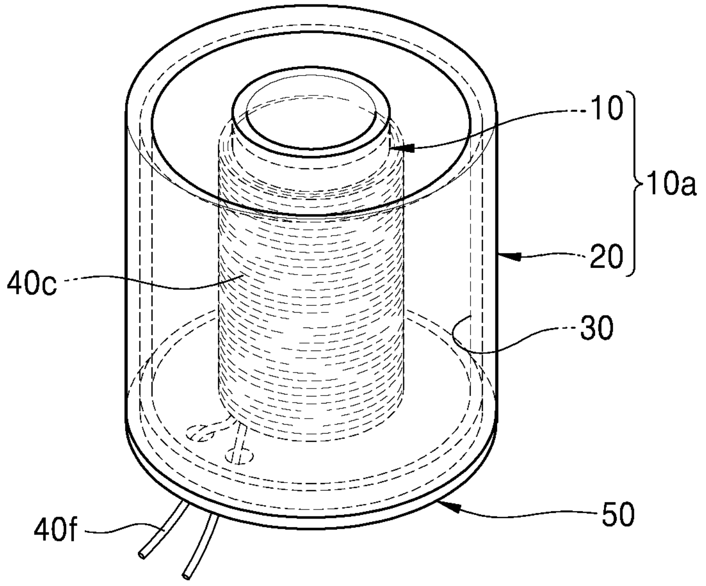

FIGS. 11 and 12 illustrate an operation of sealing, with a sealing stopper 50, a space 20*v* between the heat transfer pipe 10 and the cover 20 in the assembly 10*a* of the heat transfer pipe 10 and the cover 20 (see S140 in FIG. 1). The operation of sealing the space 20*v* includes an operation of placing the assembly 10*a* of the heat transfer pipe 10 and the cover 20 in a high-temperature atmosphere, and an operation of coupling the sealing stopper 50 to an end of the cover 20, which is different from the end of the cover 20 coupled to the heat transfer pipe 10, under a high-temperature atmosphere.

The sealing stopper 50 may include a heat-resistant material such as heat-resistant rubber, heat-resistant silicon, or heat-resistant plastic. The sealing stopper 50 includes, in the center thereof, a central through hole through which a lower end of the heat transfer pipe 10 may pass, and further includes a through hole 50*f* through which the lead wire 40*f* of the heater 40*c* may pass.

In order to couple the sealing stopper 50 to the end of the cover 20, an adhesive may be placed between the sealing stopper 50 and the cover 20, thereby securing a firm coupling state between the sealing stopper 50 and the cover 20. In addition, after the lead wire 40*f* is drawn to the outside of the sealing stopper 50 through the through hole 50*f* of the sealing stopper 50 while the sealing stopper 50 is coupled to the cover 20, the through hole 50*f* may be completely sealed by applying a sealing material such as heat-resistant silicon to the through hole 50*f*.

As shown in FIG. 12, after a heater module is assembled by coupling the sealing stopper 50 to the assembly 10*a* of the heat transfer pipe 10 and the cover 20, an operation of cooling the heater module may be performed. As a result, the air expanded in the high-temperature atmosphere is cooled and contracts, and thus, a vacuum state is naturally formed inside the heater module.

Figure 13A:
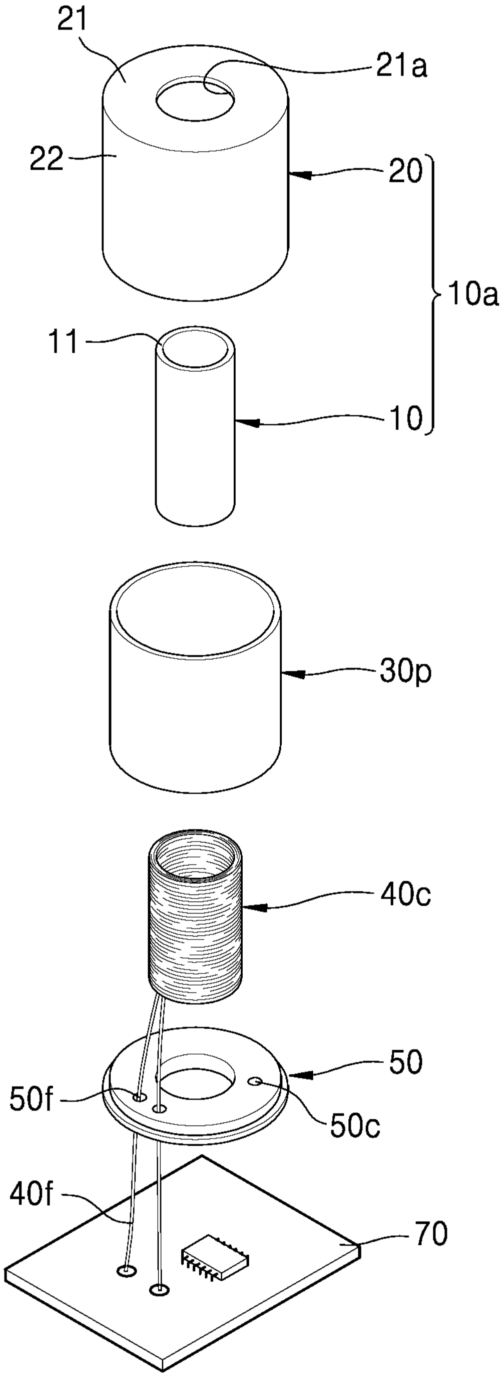
FIG. 13A is a perspective view illustrating separate components of a heater module manufactured by a method of manufacturing a heater module according to another embodiment.
Figure 13B:
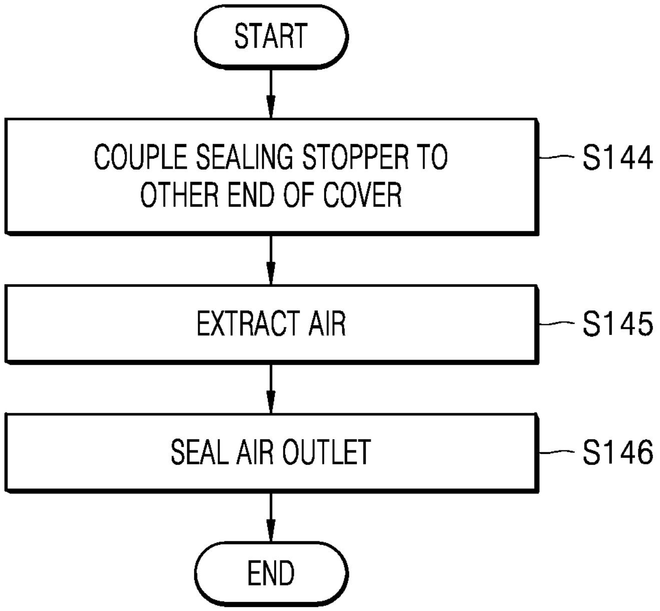
FIG. 13B is a flowchart illustrating an example of the method of manufacturing a heater module according to the embodiment shown in FIG. 13A.

FIG. 13A is an exploded view of a heater module manufactured by a method for manufacturing a heater module according to another embodiment, and FIG. 13B is a flowchart illustrating an example of an operation of the method of manufacturing the heater module according to the embodiment shown in FIG. 13A.

FIGS. 13A and 13B show another example for sealing, with a sealing stopper, a space between a heat transfer pipe and a cover.

The heater module according to the embodiment shown in FIG. 13A includes a heat transfer pipe 10, a cover 20, a heat reflecting pipe 30*p*, a heater 40*c*, and a sealing stopper 50. The heat transfer pipe 10 has a hollow shape and includes a material capable of transferring heat. The cover 20 has a hollow shape and includes one end 21 including a coupling hole 21*a* integrally coupled to one end 11 of the heat transfer pipe 10, and a sidewall 22 connected to the one end 21 and spaced apart from the heat transfer pipe 10 to surround the heat transfer pipe 10. The heat reflecting pipe 30*p* is arranged inside the cover 20 to function as a heat reflector. The heater 40*c* is arranged outside of the heat transfer pipe 10 and generates heat by a signal applied from the outside. The sealing stopper 50 seals a space between the heat transfer pipe 10 and the cover 20 such that the space between the heat transfer pipe 10 and the cover 20 is in a vacuum state in which the internal pressure of the space is lower than atmospheric pressure.

When the assembly of the heater module is completed by coupling the sealing stopper 50 to the assembly 10*a* of the heat transfer pipe 10 and the cover 20, a controller 70 may be electrically connected to a lead wire 40*f* drawn to the outside of the sealing stopper 50 through a through hole 50*f* of the sealing stopper 50. The controller 70 may include a circuit board including a memory, which stores a control program for controlling the heater 40*c* or information related to program execution, and/or a control semiconductor chip.

Referring to FIGS. 13A and 13B, the operation of sealing, with a sealing stopper, a space between a heat transfer pipe and a cover includes operation S144 of coupling the sealing stopper 50 to the other end of the cover 20, operation S145 of extracting air in the space between the heat transfer pipe 10 and the cover 20 to the outside of the cover 20 through an air outlet 50*c* formed in the sealing stopper 50, and operation S146 of sealing the air outlet 50*c* of the sealing stopper 50.

The operation S145 of extracting air in the space between the heat transfer pipe 10 and the cover 20 may be performed in a manner of connecting an air pump operated by electric power or fluid pressure or a manual air pump to the air outlet 50*c* and extracting air inside the heater module to the outside.

Figure 14:
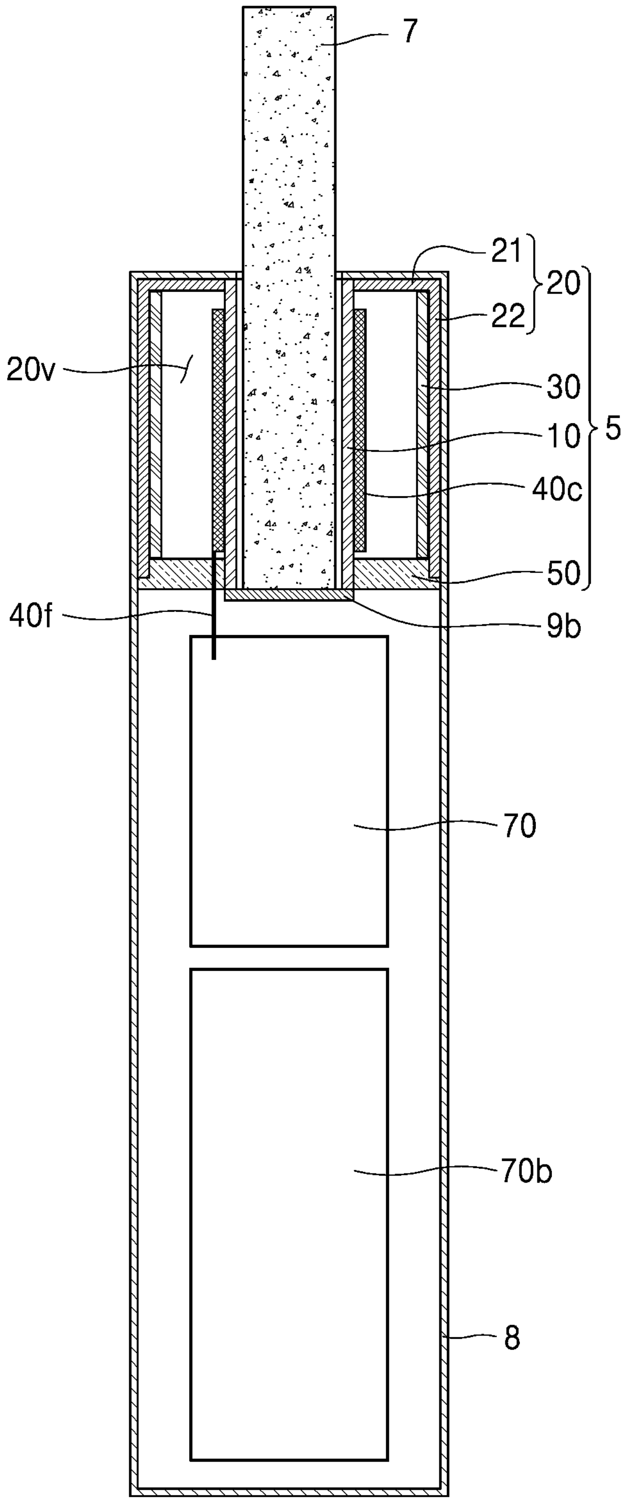
FIG. 14 is a cross-sectional view illustrating an aerosol-generating device including a heater module according to an embodiment.

FIG. 14 is a cross-sectional view illustrating an aerosol-generating device including a heater module according to an embodiment. The heater module according to the embodiments shown in FIGS. 1 to 13 may be applied to an aerosol-generating device as shown in FIG. 14.

The aerosol-generating device according to the embodiment shown in FIG. 14 includes a heater module 5, a controller 70 electrically connected to a lead wire 40*f* of the heater module 5 to control the operation of the heater 40*c*, and a battery 70*b* for supplying power to the controller 70 and the heater module 5. The heater module 5 includes a heat transfer pipe 10 having a hollow shape, a cover 20 including an end 21 integrally coupled to the heat transfer pipe 20 and a side wall 22 spaced apart from the heat transfer pipe 10, a heater 40*c* arranged outside the heat transfer pipe 10 to generate heat, a heat reflector 30 arranged inside the cover 20 to reflect heat, and a sealing stopper 50 for sealing a space 20*v* between the heat transfer pipe 10 and the cover 20.

A cigarette 7 may be inserted into the heat transfer pipe 10 of the heater module 5 mounted on the aerosol-generating device. A support plate 9*b* for supporting an end of the cigarette 7 is installed at the lower end of the heat transfer pipe 10.

The heater module 5, the controller 70, and the battery 70*b* of the aerosol-generating device may be accommodated in a case 8.

In FIG. 14, the heater module 5, the controller 70, and the battery 70*b* are arranged in a line. However, embodiments are not limited by this arrangement structure, and the arrangements of the heater module 5, the controller 70, and the battery 70*b* may be variously modified.

When the cigarette 7 is inserted into the aerosol-generating device, the aerosol-generating device heats the heater 40*c*. The temperature of an aerosol-generating material in the cigarette 7 is increased by the heated heater 40*c*, thereby generating an aerosol. The generated aerosol is delivered to the user through a filter of the cigarette 7. Herein, the term "cigarette" herein may refer to an aerosol-generating article (i.e., substrate) which has a shape similar to a traditional combustive cigarette. This cigarette (i.e., cigarette-type aerosol generating article) may contain an aerosol-generating material and generate aerosols by operation (e.g., heating) of an aerosol-generating device.

The battery 70*b* supplies power used to operate the aerosol-generating device. For example, the battery 70*b* may supply power to heat the heater 40*c*, and may supply power required for the controller 70 to operate. In addition, the battery 70*b* may supply power required to operate displays, sensors, and motors installed in the aerosol-generating device.

The controller 70 controls overall operation of the aerosol-generating device. Specifically, the controller 70 controls the operations of the battery 70*b* and the heater 40*c* as well as other components included in the aerosol-generating device. In addition, the controller 70 may determine whether the aerosol-generating device is in an operable state by checking the state of each of the components of the aerosol-generating device.

The controller 70 includes at least one processor. The processor may be implemented as an array of a plurality of logic gates or may be implemented as a combination of a general-purpose microprocessor and a memory in which a program executable in the microprocessor is stored. Also, the controller 70 may be implemented with other types of hardware.

The heater 40*c* is heated by the power supplied from the battery 70*b*. When the cigarette 7 is inserted into the heat transfer pipe 10 of the heater module 5, the heater 40*c* heats the cigarette 7 to increase the temperature of the aerosol-generating material in the cigarette 7.

The aerosol-generating device may further include general-purpose components in addition to the battery 70*b*, the controller 70 and the heater 40*c*. For example, the aerosol-generating device may include a display capable of outputting visual information and/or a motor for outputting tactile information. In addition, the aerosol-generating device may include at least one sensor (e.g., a puff detection sensor, a temperature detection sensor, a cigarette insertion detection sensor, etc.).

In addition, the aerosol-generating device may be manufactured to have a structure in which external air may flow in or internal gas may flow out even while the cigarette 7 is inserted into the aerosol-generating device.

As another example, the heater 40*c* may be an induction heating type heater. Specifically, the heater 40*c* may include an electrically conductive coil for heating the cigarette by an induction heating method, and the cigarette may include a susceptor that may be heated by an induction heating type heater.

Although not shown in FIG. 14, the aerosol-generating device may be included in a system together with a separate cradle. For example, the cradle may be used to charge the battery 70*b* of the aerosol-generating device. Also, the heater 40*c* may be heated in a state in which the cradle and the aerosol-generating device are coupled to each other.

The cigarette 7 may be similar to a general combustion type cigarette. For example, the cigarette 7 may be divided into a first portion including an aerosol-generating material and a second portion including a filter and the like. Alternatively, an aerosol-generating material may be included in the second portion of the cigarette 7. For example, an aerosol-generating material made in the form of granules or capsules may be inserted into the second portion.

The first portion may be fully inserted into the aerosol-generating device, and the second portion may be exposed to the outside. Alternatively, the first portion may be partially inserted into the aerosol-generating device, or the first portion and a portion of the second portion may be inserted into the aerosol-generating device. The user may inhale aerosol while holding the second portion by the mouth of the user. In this case, the aerosol is generated by passing external air through the first portion, and the generated aerosol is delivered to the user's mouth through the second portion.

As an example, external air may be introduced through at least one air passage formed in the aerosol-generating device. For example, opening and closing of the air passage formed in the aerosol-generating device and/or the size of the air passage may be adjusted by the user. Accordingly, the amount of smoke and a smoking feeling may be adjusted by the user. As another example, external air may be introduced into the cigarette 7 through at least one hole formed on the surface of the cigarette 7.

Figure 15:
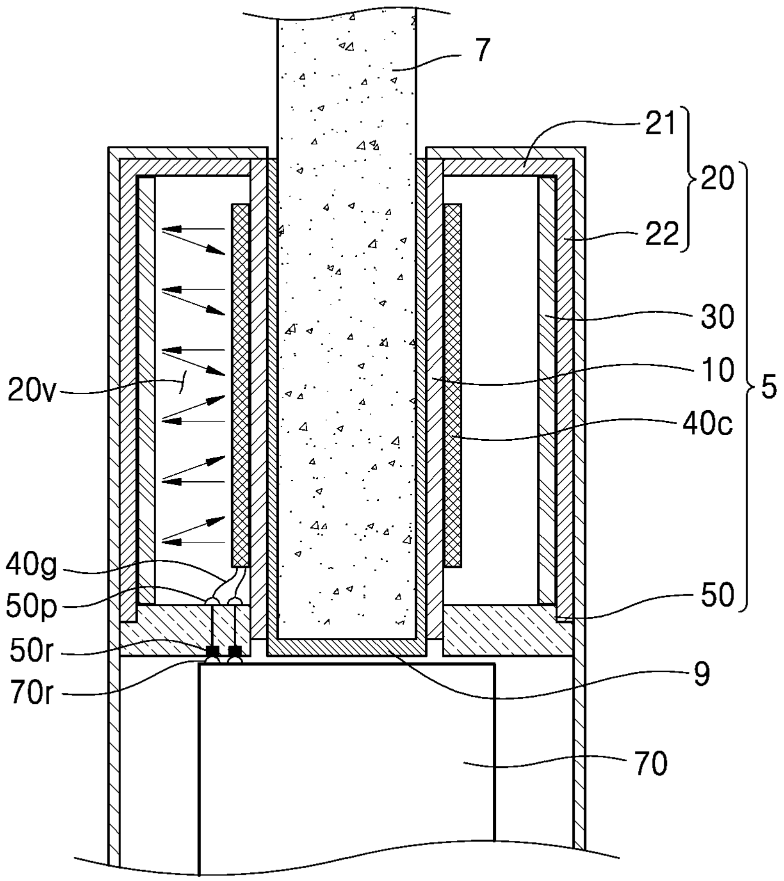
FIG. 15 is an enlarged cross-sectional view illustrating a portion of an aerosol-generating device including a heater module according to another embodiment.

FIG. 15 is an enlarged cross-sectional view illustrating a portion of an aerosol-generating device including a heater module according to another embodiment.

The aerosol-generating device according to the embodiment shown in FIG. 15 is generally similar to the aerosol-generating device according to the embodiment shown in FIG. 14, but a cigarette receiving pipe 9 having a diameter corresponding to the outer diameter of a cigarette 7 and having a hollow shape is additionally arranged inside a heat transfer pipe 10. The cigarette receiving pipe 9 may include a metal material capable of transferring heat well, and may perform a function of stably supporting the cigarette 7 while transferring heat transferred from the heat transfer pipe 10 to the cigarette 7.

A wire 40*g* for supplying electricity to a heater 40*c* does not pass through a sealing stopper 50. Instead, the wire 40*g* is electrically connected to an upper electrode 50*p* formed on the upper side of the sealing stopper 50. The wire 40*g* may be electrically connected to the upper electrode 50*p* by a soldering method, or may be electrically connected to the upper electrode 50*p* by using a separate connector.

The upper electrode 50*p* of the sealing stopper 50 is electrically connected to a lower electrode 50*r* of the sealing stopper 50. The upper electrode 50*p* and the lower electrode 50*r* of the sealing stopper 50 may be electrically connected to each other by a circuit pattern formed inside the sealing stopper 50. When a heater module 5 is installed in the aerosol-generating device, the lower electrode 50*r* of the sealing stopper 50 is electrically connected to a connection pad 70*r* of a controller 70.

The connection pad 70*r* is a connection terminal for transmitting an electric signal of the controller 70 to the heater 40*c*. The connection pad 70*r* may be formed, for example, by a pogo pin elastically supported by an elastic unit such as a spring or by a circuit pattern directly formed on a circuit board and exposed to the outside of the controller 70.

According to the coupling structure of the heater 40*c* and the sealing stopper 50 as described above, the wire 40*g* for supplying electricity to the heater 40*c* may be stably connected to the controller 70 without passing through the sealing stopper 50. Therefore, it is possible to omit a sealing operation to be performed on the sealing stopper 50 in relation to an electrical connection portion between the heater 40*c* and the controller 70.

When power is supplied to the heater module 5 in the aerosol-generating device according to the above-described embodiments, the heater 40*c* generates heat to heat the cigarette 7. Referring to FIG. 15, heat generated by the heater 40*c* is radiated from the outer surface and the inner surface of the heater 40*c*. The inner surface of the heater 40*c* is a surface facing the cigarette 7, and the outer surface of the heater 40*c* is the opposite surface.

Heat radiated from the inner surface of the heater 40*c* is transferred to the cigarette 7 through the heat transfer pipe 10 and the cigarette receiving pipe 9, and thus, an aerosol-generating action in the cigarette 7 is smoothly performed.

Heat radiated from the outer surface of the heater 40*c* is radiated to the space 20*v* between the heat transfer pipe 10 and the cover 20. When air having a pressure level similar to atmospheric pressure is in the space 20*v* between the heat transfer pipe 10 and the cover 20, heat may be directly conducted to the cover 20 through the air or heat may be transferred to the cover 20 through the convection action of air, and accordingly, heat loss, in which heat of the heater 40*c* is radiated to the outside of the cover 20, may occur. This heat loss may reduce the heating performance of the heater 40*c* that heats the cigarette 7 and also cause danger and discomfort to the user by transferring heat to the user's body being in contact with the case 8.

In the aerosol-generating device according to the above-described embodiments, because the space 20*v* between the heat transfer pipe 10 and the cover 20 maintains a vacuum state, which refers to a state of pressure lower than atmospheric pressure as aforementioned, heat transferring actions, in which heat is directly conducted to the cover 20 through air in the space 20*v* between the heat transfer pipe 10 and the cover 20 or heat is transferred to the cover 20 through the convection action of air, may be reduced.

In addition, heat radiated from the heater 40*c* toward the cover 20 is reflected by a heat reflector 30 located inside the cover 20, and the reflected heat is transferred back to the heat transfer pipe 10 and the cigarette 7. Accordingly, the effect of a heating action of heating the cigarette 7 may be improved, thereby improving the flavor of aerosol generated from the cigarette 7 and increasing the amount of aerosols generated while reducing energy loss.

Figure 16:
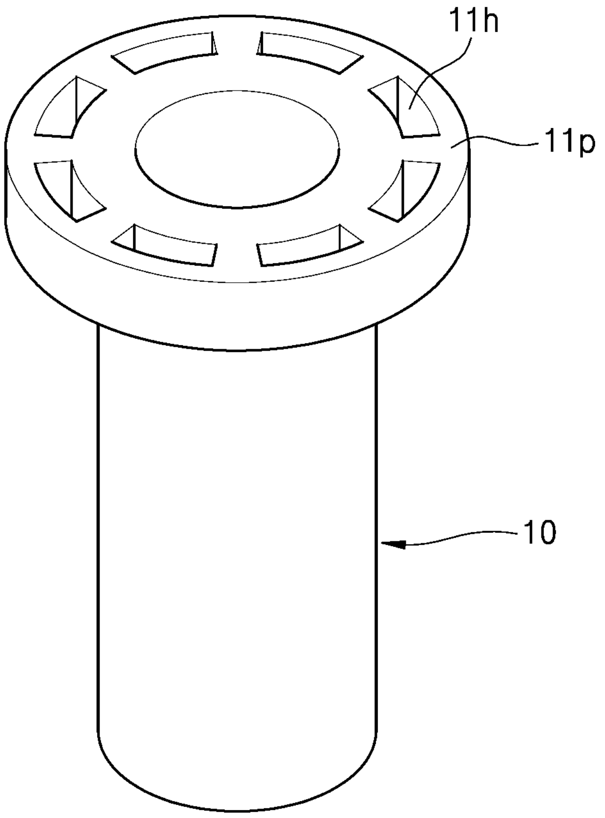
FIG. 16 is a perspective view illustrating some components of a heater module according to an embodiment.
Figure 17:
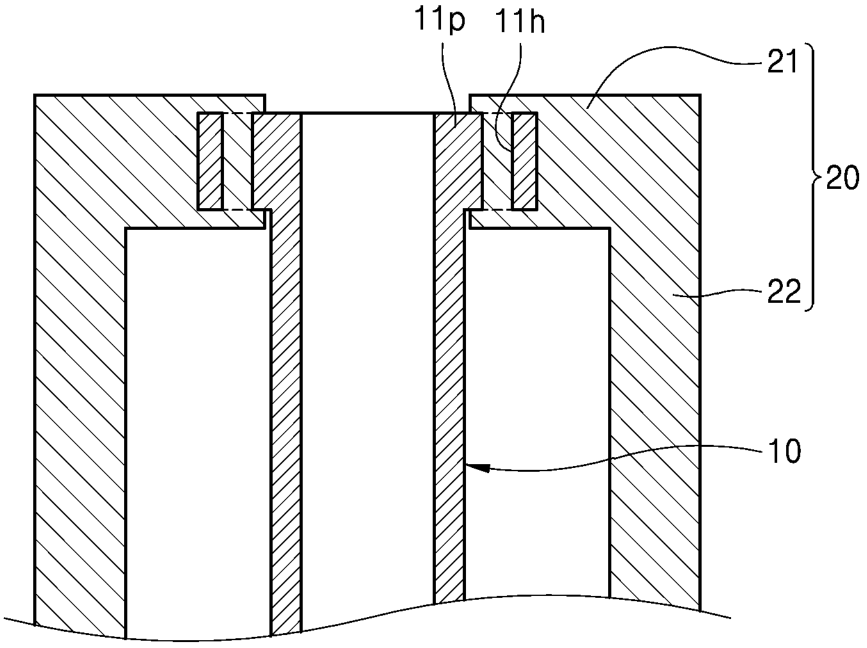
FIG. 17 is a cross-sectional view illustrating a coupling relationship between some components of the heater module according to the embodiment shown in FIG. 16.

FIG. 16 is a perspective view illustrating some components of a heater module according to an embodiment, and FIG. 17 is a cross-sectional view illustrating a coupling relationship between some components of the heater module according to the embodiment shown in FIG. 16.

In the heater module according to the embodiment shown in FIGS. 16 and 17, a heat transfer pipe 10 includes a flange 11*p* protruding radially from one end of the heat transfer pipe 10, and a coupling through hole 11*h* formed in the flange 11*p*.

A cover 20 coupled to the heat transfer pipe 10 by an insert molding process has one end 21 integrally coupled to the coupling through hole 11*h* of the flange 11*p* of the heat transfer pipe 10, and a sidewall 22 connected to the one end 21 and spaced apart from the outer surface of the heat transfer pipe 10 to surround the outer surface of the heat transfer pipe 10. As shown in FIG. 17, molten resin used to mold the cover 20 may flow into the coupling through hole 11*h* of the flange 11*p* of the heat transfer pipe 10 in an operation of molding the cover 20 by the insert molding process, and accordingly a coupling between the cover 20 and the heat transfer pipe 10 may be more solid.

Figure 18:
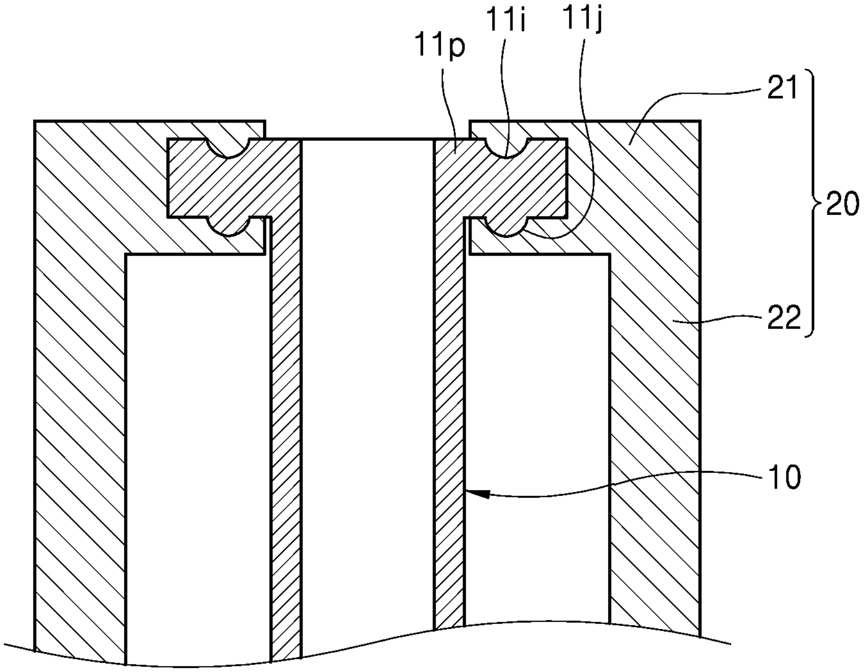
FIG. 18 is a cross-sectional view illustrating a coupling relationship between some components of a heater module according to another embodiment.

FIG. 18 is a cross-sectional view illustrating a coupling relationship between some components of a heater module according to another embodiment.

In the heater module according to the embodiment shown in FIG. 18, a heat transfer pipe 10 includes a flange 11*p* protruding radially from one end of the heat transfer pipe 10, and a coupling protrusion 11*j* and a coupling groove 11*i* which are formed in the flange 11*p*.

Therefore, in an operation of molding the cover 20 by the insert molding process, molten resin used to mold the cover 20 may surround the coupling protrusion 11*j* of the flange 11*p* of the heat transfer pipe 10 and flow into the coupling groove 11*i*, and accordingly a coupling between the cover 20 and the heat transfer pipe 10 may be more solid.

Figure 19:
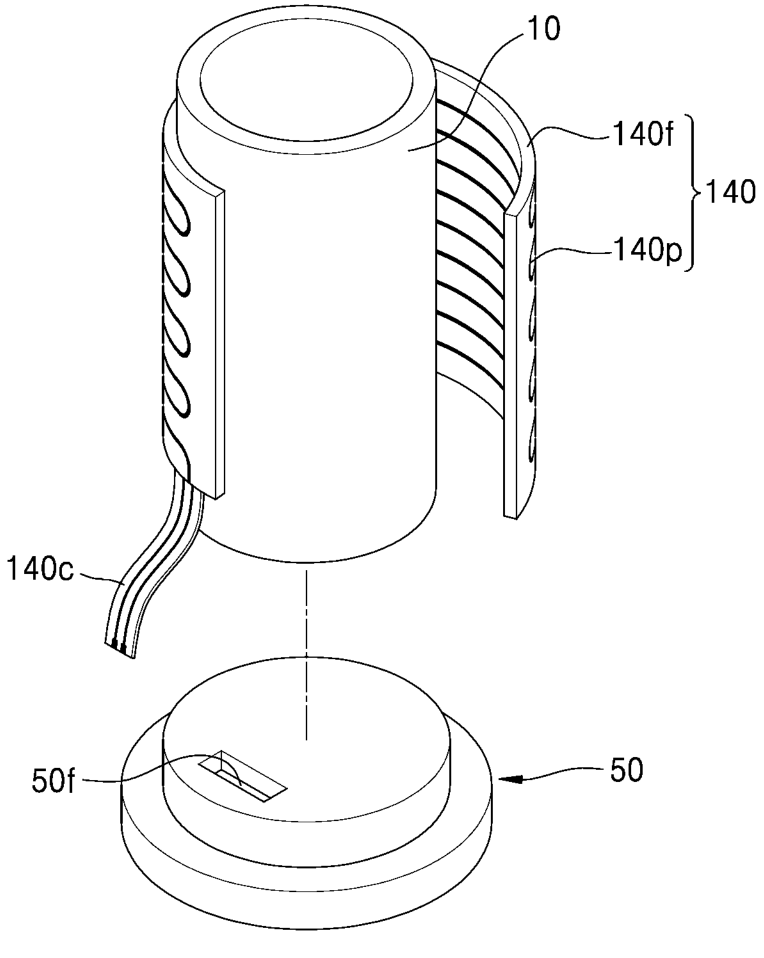
FIG. 19 illustrates a method of arranging a heater on the outer surface of a heat transfer pipe, according to another embodiment.

FIG. 19 illustrates a method of manufacturing a heater module according to an embodiment.

The method of manufacturing the heater module according to the embodiment shown in FIG. 19 may correspond to operation S120 of arranging a heater on the outer surface of a heat transfer pipe in FIG. 1.

An operation of arranging a heater 140 on the outer surface of a heat transfer pipe 10 includes an operation of manufacturing a film heater including a cylindrical film 140*f* corresponding to the external shape of the heat transfer pipe 10 and a conductive wire 140*p* arranged on the cylindrical film 140*f* to generate heat when electricity is applied from the outside, and an operation of arranging the film heater to surround the outer surface of the heat transfer pipe 10.

The operation of manufacturing the film heater may include an operation of manufacturing a flexible circuit substrate by printing a circuit pattern such as a copper pattern on a flexible substrate made of a flexible material such as polyimide, or laminating a flexible substrate and a circuit layer by using a process such as lamination.

The operation of arranging the film heater to surround the outer surface of the heat transfer pipe 10 may be performed by a method of winding a rectangular plate-shaped flexible substrate board to form a cylindrical shape corresponding to the shape of the outer surface of the heat transfer pipe 10 and then inserting the heat transfer pipe 10 into a film heater having a cylindrical shape.

Alternatively, by modifying this method, in the operation of arranging the film heater on the outer surface of the heat transfer pipe 10, a rectangular plate-shaped flexible circuit substrate may be prepared, and then the flexible circuit substrate may be directly wound on the outer surface of the heat transfer pipe 10 such that the final shape of the film heater fixed to the outer surface of the heat transfer pipe 10 may be a cylindrical shape.

As described above, the heater 140 arranged on the outer surface of the heat transfer pipe 10 finally has a cylindrical shape, but the cross-section of the heater 140 does not have to be a completely closed circle and may have an arc shape in which a portion of the cross-section of the heater 140 is open.

The heater 140 includes a lead wire 140*c* for receiving electricity from the outside. A sealing stopper 50 includes a through hole 50*f* through which the lead wire 140*c* of the heater 140 may pass.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the disclosure is shown in the claims rather than the above description, and all differences within the scope equivalent thereto should be construed as being included in the disclosure.

INDUSTRIAL APPLICABILITY

The embodiments relate to a heater module with improved heating performance and safety, a method of manufacturing the heater module, and an aerosol-generating device including the heater module.

The invention claimed is:

1. A method of manufacturing a heater module for an aerosol-generating device, the method comprising:

preparing a heat transfer pipe having a hollow shape and including a thermal conductive material;

forming an assembly of the heat transfer pipe and a cover by insert molding in which the heat transfer pipe is placed in a mold and resin is injected into the mold, such that one end of the cover is integrally molded to an end of the heat transfer pipe while a side wall of the cover is spaced apart from the heat transfer pipe and surrounds the heat transfer pipe;

arranging a heater on an outer surface of the heat transfer pipe; and sealing, with a sealing stopper, a space between the heat transfer pipe and the cover such that internal pressure of the space is lower than atmospheric pressure, wherein the space, which has the internal pressure lower than the atmospheric pressure, is partially defined by the heater and the sealing stopper, and wherein the cover comprises a single body formed from the resin and comprising the one end and the side wall.

2. The method of claim 1, wherein the sealing of the space with the sealing stopper includes placing the assembly of the heat transfer pipe and the cover in a high-temperature atmosphere, and coupling the sealing stopper to another end of the cover.

3. The method of claim 2, further comprising forming, after the sealing of the space with the sealing stopper, a vacuum state within the assembly of the heat transfer pipe and the cover by cooling the assembly.

4. The method of claim 1, wherein the sealing of the space with the sealing stopper includes coupling the sealing stopper to another end of the cover, extracting air from the space between the heat transfer pipe and the cover through an air outlet formed in the sealing stopper, and sealing the air outlet.

5. The method of claim 1, further comprising:

forming a heat reflector inside the cover, between the molding of the assembly of the heat transfer pipe and the cover and the arranging of the heater.

6. The method of claim 5, wherein the forming of the heat reflector includes preparing a heat reflecting pipe including a heat reflective material, and inserting the heat reflecting pipe into the cover.

7. The method of claim 5, wherein the forming of the heat reflector includes coating a heat reflective material on an inside of the cover.

8. The method of claim 5, wherein the space, which has the internal pressure lower than the atmospheric pressure, is at least partially defined by and between the heater and the heat reflector.

9. The method of claim 1, wherein the arranging of the heater includes preparing a coil heater in which a heating wire is wound to form a cylindrical shape corresponding to a shape of the heat transfer pipe, and arranging the coil heater on the outer surface of the heat transfer pipe.

10. The method of claim 1, wherein the arranging of the heater includes manufacturing a film heater including a cylindrical film corresponding to a shape of the heat transfer pipe and a conductive wire arranged on the cylindrical film and configured to generate heat when electricity is applied, and arranging the film heater on the outer surface of the heat transfer pipe.

11. The method of claim 1, wherein the heat transfer pipe includes a flange protruding radially from the end of the heat transfer pipe, and at least one from among a groove, a protrusion, and a through hole is formed in the flange such that the cover is integrally molded to the flange, wherein at least a portion of the one end of the cover is within the at least one from among the groove, the protrusion, and the through hole.

12. A heater module for an aerosol-generating device, comprising:

a heat transfer pipe having a hollow shape and including a thermal conductive material;

a cover comprising a single body formed from resin and having one end integrally molded to an end of the heat transfer pipe, and a side wall of the single body spaced apart from the heat transfer pipe and surrounding the heat transfer pipe;

a heater arranged on an outer surface of the heat transfer pipe and configured to generate heat; and a sealing stopper that seals a space between the heat transfer pipe and the cover such that internal pressure of the space is lower than atmospheric pressure, wherein the space, which has the internal pressure lower than the atmospheric pressure, is partially defined by the heater and the sealing stopper.

13. The heater module of claim 12, further comprising:

a heat reflector arranged inside the cover and configured to reflect heat generated from the heater.

14. The heater module of claim 12, wherein the heater is wound to form a cylindrical shape corresponding to a shape of the heat transfer pipe.

15. The heater module of claim 12, wherein the heater includes a cylindrical film corresponding to a shape of the heat transfer pipe, and a conductive wire arranged on the cylindrical film and configured to generate heat when electricity is applied.

16. The heater module of claim 12, wherein the heat transfer pipe includes a flange protruding radially from the end of the heat transfer pipe, and at least one from among a groove, a protrusion, and a through hole formed in the flange such that the cover is integrally molded to the flange, wherein at least a portion of the one end of the cover is within the at least one from among the groove, the protrusion, and the through hole.

17. An aerosol-generating device comprising:

the heater module according to claim 12; and a controller electrically connected to the heater module and configured to control operation of the heater module.

* * * * *